(12) United States Patent
Herkerdorf et al.

(10) Patent No.: US 7,146,478 B2
(45) Date of Patent: Dec. 5, 2006

(54) CACHE ENTRY SELECTION METHOD AND APPARATUS

(75) Inventors: Andreas Herkerdorf, Ammersee (DE);
Ronald P Luijten, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 10/472,275

(22) PCT Filed: Mar. 15, 2002

(86) PCT No.: PCT/IB02/00822

§ 371 (c)(1),
(2), (4) Date: Mar. 29, 2004

(87) PCT Pub. No.: WO02/076042

PCT Pub. Date: Sep. 26, 2002

(65) Prior Publication Data

US 2004/0146044 A1   Jul. 29, 2004

(30) Foreign Application Priority Data

Mar. 19, 2001 (EP) .................................. 01810264

(51) Int. Cl.
*G06F 12/08* (2006.01)
*G06F 13/18* (2006.01)

(52) U.S. Cl. .................... 711/167; 711/118; 711/1; 711/151; 711/158; 710/29; 710/40; 710/58

(58) Field of Classification Search ................ 711/113, 711/133, 137
See application file for complete search history.

(56) References Cited

U.S. PATENT DOCUMENTS

| 6,021,470 | A  | * | 2/2000  | Frank et al. ................. 711/138 |
| 6,317,778 | B1 | * | 11/2001 | Dias et al. ................... 709/214 |
| 6,434,608 | B1 | * | 8/2002  | Desai ........................... 709/217 |
| 6,463,508 | B1 | * | 10/2002 | Wolf et al. ................... 711/133 |
| 6,532,492 | B1 | * | 3/2003  | Presler-Marshall .......... 709/223 |
| 6,546,422 | B1 | * | 4/2003  | Isoyama et al. ............. 709/225 |
| 6,597,684 | B1 | * | 7/2003  | Gulati et al. ................. 370/351 |

(Continued)

FOREIGN PATENT DOCUMENTS

EP          1035687 A2 *   9/2000

(Continued)

OTHER PUBLICATIONS

Lakshman, T.V., High-Speed Policy-based Packet Forwarding Using Efficient Multi-dimensional Range Matching, Jan. 1998, ACM, vol. 8, 203-214.*

*Primary Examiner*—B. James Peikari
(74) *Attorney, Agent, or Firm*—Louis P. Herzberg

(57) ABSTRACT

A method for selectively inserting cache entries into a cache memory is proposed in which incoming data packets are directed to output links according to address information. The method comprises the following steps: a) an evaluation step for evaluating for each incoming data packet classification information which is relevant to the type of traffic flow or to the traffic priority to which the data packet is associated; b) a selection step for selecting based on the result of the evaluation step whether for the data packet the cache entry is to be inserted into the cache memory; c) an entry step for inserting as the cache entry into the cache memory, in the case the result of the selection step is that the cache entry is to be inserted, for the data packet the address information and associated output link information.

17 Claims, 4 Drawing Sheets

U.S. PATENT DOCUMENTS

| | | | |
|---|---|---|---|
| 6,665,297 B1 * | 12/2003 | Hariguchi et al. | 370/392 |
| 2002/0085560 A1 * | 7/2002 | Cathey et al. | 370/392 |
| 2002/0093973 A1 * | 7/2002 | Tzeng | 370/419 |
| 2003/0065812 A1 * | 4/2003 | Beier et al. | 709/236 |

FOREIGN PATENT DOCUMENTS

| | | | |
|---|---|---|---|
| JP | H09-204345 | | 8/1997 |
| JP | 2000-035912 | | 2/2000 |
| JP | 2000-106744 | * | 4/2000 |
| JP | 2000-513165 | | 10/2000 |
| JP | 2001-045061 | | 2/2001 |
| JP | 2001-290718 | | 10/2001 |

\* cited by examiner

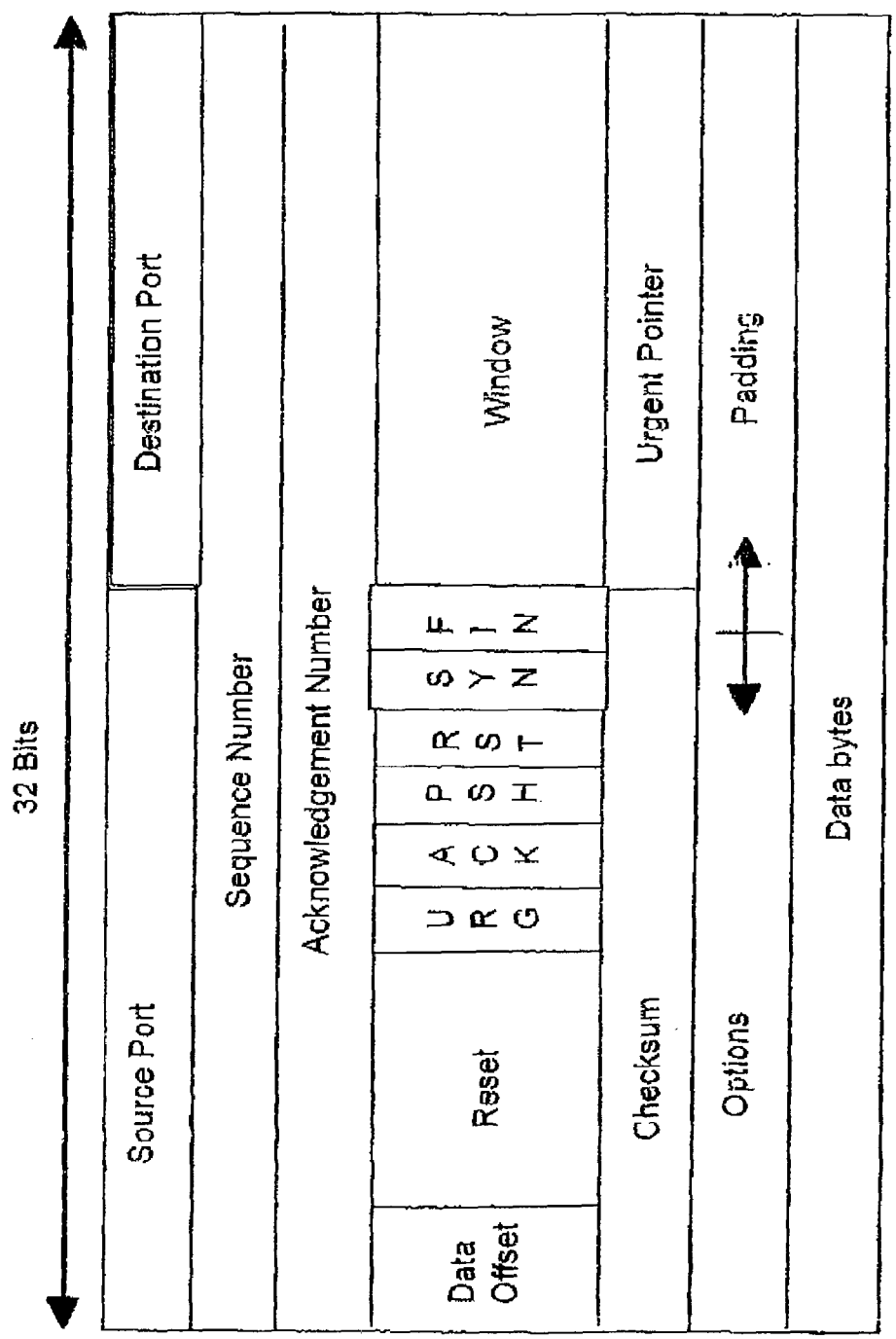
FIG. 4   TCP Message with Cache Entry Selection Criteria

CACHE ENTRY SELECTION METHOD AND APPARATUS

CROSS REFERENCE and PRIORITY

This application filed under 35 USC 371, is cross-referenced with, and claims priority from, International Patent Application PCT/IB02/00822 filed on 15 Mar. 2002, and published in English with Publication No. WO02/076042 on 26 Sep. 2002, under PCT article 21(2), which in turn claims priority of EP 01810264.0, filed on 19 Mar. 2001.

FIELD OF INVENTION

The present invention is concerned with the routing of data packets in a communication network, according to addresses (or directional information) contained in the header of each data packet. In particular, it is concerned with handling of large quantities of data packets in routing nodes in which caches are used for storing previously used addresses together with associated routing information, to avoid the lookup operation in a routing table for each occurrence of frequently used data packet addresses. As a data packet may be seen any information unit, e.g. as processed by CPUs.

BACKGROUND

In modern communication systems based on data packet transmission, such as the Internet, millions of data packets per second are forwarded in each switching node from the input to one of several output links, depending on the address information contained in the data packet header. The association between data packet address and output link (or route) is stored in a routing table of the switching node, and for each data packet a lookup or search operation is made in this table for obtaining the routing information, also referred to as output link identification. This lookup may cause delays if resources are limited. As many data packets—such as periodic data packets of voice streams, or bursts of data packets for file transfers—contain the same address, one has used cache memories for storing each addresses when it first occurred and the respective associated output or routing information once it has been found by a lookup operation. This avoids many recurring lookup searches for the same address, but requires large sizes of cache memories. However, due to the finite size of any cache memory, storage locations have to be cleared for new cache entries once the cache is filled up. Often, an LRU (least recently used) algorithm is used for this task, thus eliminating cache entries which obviously were not used for some time.

However, when the cache memory management employs an LRU algorithm, and when the communication system has to transfer a great number of data packets for traffic of periodic nature such as voice or video transmissions, many intervening data packets will occur between consecutive data packets of the same periodic transmission, so that most cache entries would have been eliminated before they can be used again. This is of course very ineffective. Furthermore, some traffic categories should be handled with higher priority than others. Thus, some kind of optimization or improvement is required for the cache entry procedure to avoid the handling effort and the waste of cache space for cache entries which will be used rarely or only once anyway.

The usage of cache memories in routers of IP data packet forwarding systems has been discussed in the following publication: Peter Newman et al.: "IP Switching and Gigabit Routers", IEEE Communications Magazine, Vol. 35, No. 1 (January 1997), pp. 64–69. The result of this investigation was that caching for high-speed links at 1 Gbit/s and above will not be useful due to the lack of locality in addresses. Another approach discussed in this paper which deals with a particular (Ipsilon) IP switching system is conceptually different in that it suggests to forward connection-less IP traffic over a connection-oriented ATM traffic infrastructure.

Classification of data packets in IP switching nodes in response to the contents of their headers was discussed in T. V. Lakshman, D. Stiliadis: "High-speed Policy-based Packet Forwarding Using Efficient Multi-dimensional Range Matching", Proc. ACM SIGCOMM'98, Comp. Commun. Rev. Vol. 28, No. 4, October 1998, pp. 203–214 and also in P. Gupta, N. McKeown: "Packet Classification on Multiple Fields", ACM SIGCOMM'99, Comp. Commun. Rev. Vol. 29, No. 4, Ovt. 1999, pp. 147–160.

In none of these publications, procedures were suggested for connection-less data packet transmission systems to select, in response to the evaluation of data packet headers, certain flows or traffic categories for entry into a cache memory, to avoid later lookup operations for data packets of the same flow or traffic category, but to avoid on the other hand useless cache entries into the cache.

OBJECTS OF THE INVENTION

It is an object of the invention to improve the usage of the cache memory.

This is of particular advantage in data-packet-handling devices of switching nodes or routers. In particular, those cache entries which will be used with higher probability than others, or cache entries for traffic types which suffer more from the time delay due to routing table lookup than others, should be privileged or preferred in favor of other cache entries for e.g. periodic traffic.

SUMMARY OF THE INVENTION

A method for inserting cache entries into a cache memory is proposed in which incoming data packets are directed to output links according to address information. The method comprises the following steps:

a) an evaluation step for evaluating for each incoming data packet classification information which is relevant to the type of traffic flow or to the traffic priority to which the data packet is associated;

b) a selection step for selecting based on the result of the evaluation step whether for the data packet the cache entry is to be inserted into the cache memory;

c) an entry step for inserting as the cache entry into the cache memory, in the case the result of the selection step is that the cache entry is to be inserted, for the data packet the address information and associated output link information.

The method allows to keep cache entries for such data packet flows where it is foreseeable that additional data packets of the same data packet flow will follow within a relatively short time period, measured in data packet arrival rate, instead of data packet entries for traffic flows that are more or less evenly distributed or spaced in time e.g. with lots of data packets between two consecutive data packets of the same flow. However, periodic data packet flows which are specially identified as e.g. having a high priority, can nevertheless be selected for caching with this mechanism.

Thus, employment of this invention has following advantages: The size of the cache can be smaller than with ordinary cache entry procedures, because the cache entries can be restricted to those candidates, i.e. traffic flows which have a high probability of future cache hits. Traffic with periodic or even occasional transmissions which would need a normal lookup procedure anyway, because their cache entries would be eliminated in the meantime between two occurring data packets of the same flow, will not burden the cache memory space and the units handling cache entries.

The invention can be particularly useful in communication systems based on data packet transmission, where data packets are forwarded in switching nodes or routers from an input to one of several output links, depending on address information contained in the data packet header. The association between data packet address and output link or route is stored in a routing table of the switching node, and for each data packet a lookup or search operation is made in this table for obtaining the routing information, also referred to as output link information. Typically data packets that together form a data packet flow are selected for inserting a cache entry therefor into the cache memory.

The concept is not limited to data packet transmission systems but can be used in, or be adapted to, other systems in which reoccurring accesses to search mechanisms is performed, such as systems in which databases are accessed by different users with different frequency or urgency. In computer systems there exists also a data cache where this invention might be advantageously applied, e.g. in the context of a branch-through table, whose data should not be inserted as cache entry in the cache memory because a soon further access to the same data is improbable, whereas an often used variable for a program would be a case for which a cache entry is recommended.

LISTING OF DRAWINGS

Embodiments of the invention will be described with reference to the accompanying drawings. In the drawings.

Figure 3:
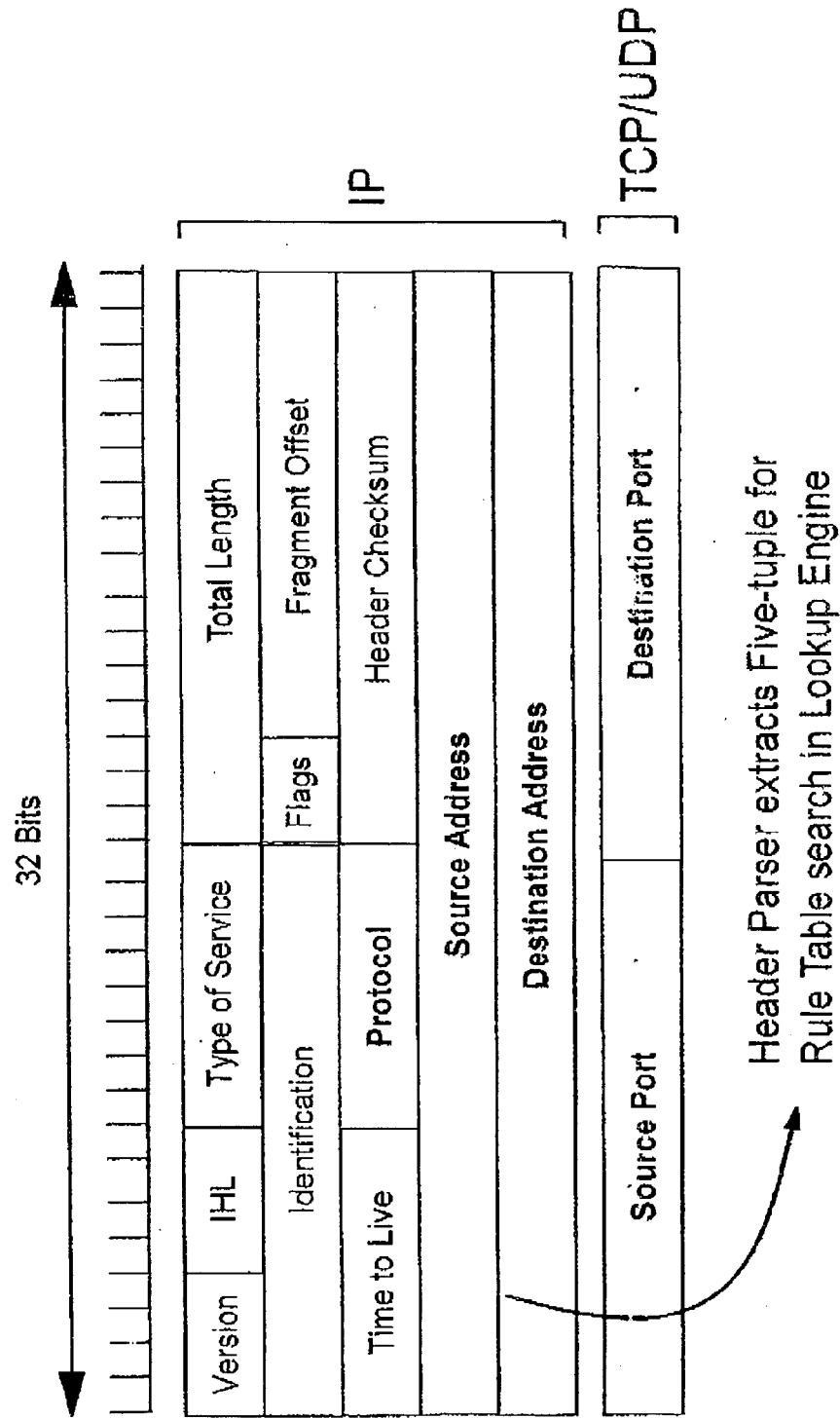

FIG. 3 shows a data packet header for schematically representing the operations of the lookup engine 19 containing the routing table, in connection with the header parser, for making cache entry decisions for cases where a priority is implicitly encoded, FIG. 4 illustrates a data packet header of bulk data packet transmissions in TCP data flows, where the start and end of a data packet group are deducible from SYN and FIN indications, for making cache entry decisions for such flows.

DETAILED DESCRIPTION OF THE EMBODIMENTS

Network Processor

Figure 1:
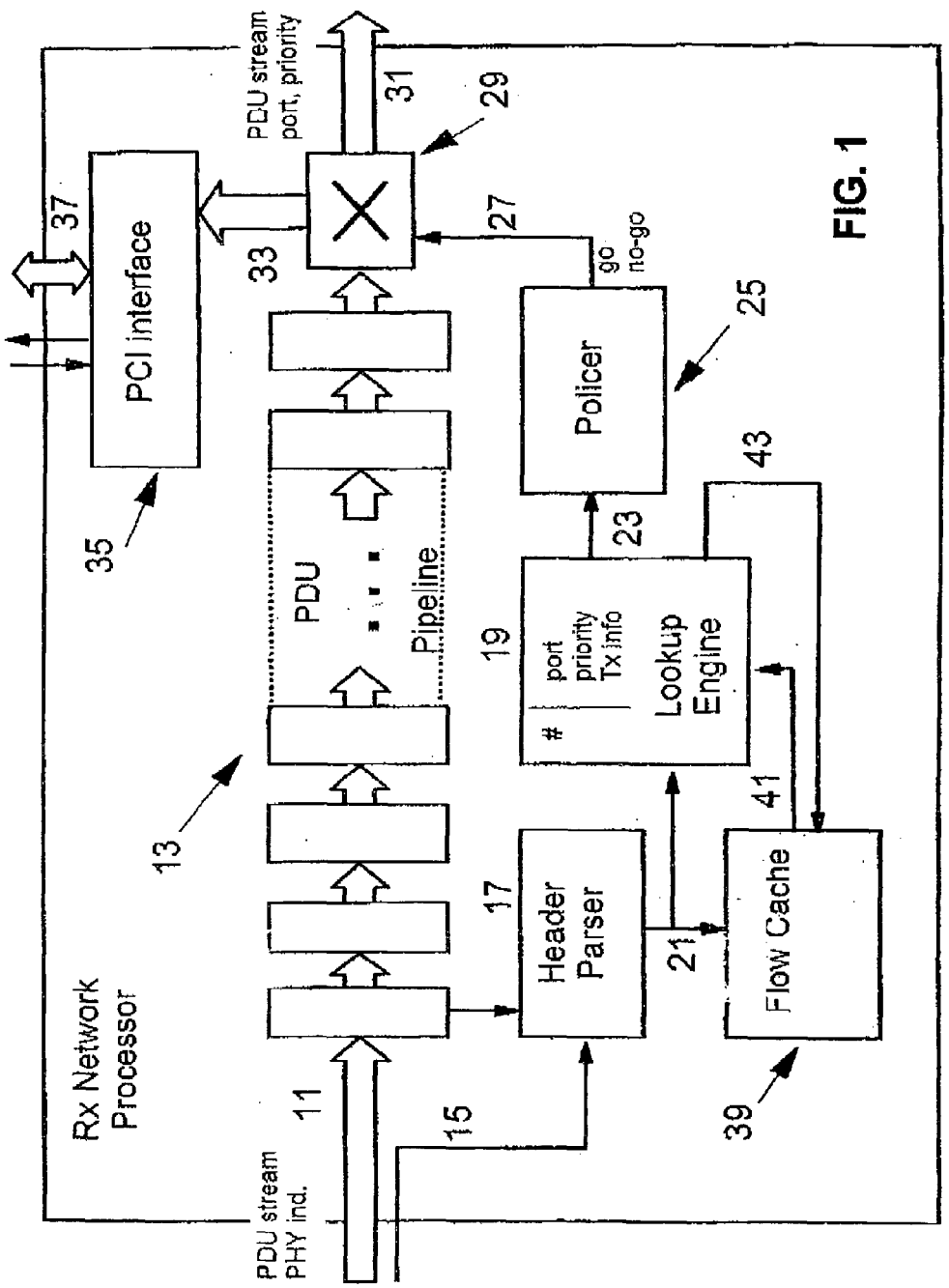
FIG. 1 is a block diagram of an Rx network processor in a switching node or router, comprising a lookup engine for performing lookup operations in a routing table and an IP switching unit, as well as a data packet header parser and a cache memory, in which the header parser and the lookup engine cooperate for selecting addresses and output link information of certain flows for cache entry.

FIG. 1 schematically shows a network processor in a node of a communication system, in which the headers of incoming data packets, also referred to as Protocol Data Units or PDUs, are analyzed so that each data packet can be directed to one of several output ports, or suppressed if the present policy requires this.

The stream of data packets is received on a bus 11 and each data packet is entered into a PDU pipeline 13 to reserve time for the header evaluation step. Each data packet header is entered via an input 15 into a header parser 17 which extracts relevant information, also referred to as classification information, such as destination address, priority, class of service, etc. from the header and transfers it to a lookup engine 19 via a connection 21. The lookup engine 19 contains a lookup table, also referred to as routing table or rule table, in which for each destination address etc. the respective output port (target port) of the node and other handling information is stored. A lookup step using the routing table is performed. The lookup result is transferred through lines 23 via a policer 25 and lines 27 to a switching unit 29 which receives the data packets from the pipeline 13 and directs each data packet, in response to the routing information received from the lookup engine 19 and the policer 25, to the correct target port over connections 31. Depending on the policies stored in the policer 25, it can either send the output link information obtained from lookup engine 19 to the switching unit 29, or a no-go signal so that the further transfer of a data packet (PDU) can be suppressed if the policy requires that.

The data packets can also be transferred through lines 33 to a PCI interface 35 for further distribution over connections 37 to a control processor (not shown) for special handling.

To save the time that is used for the lookup operations, a cache memory 39 is provided into which output information such as target port ID, etc. that was found in a previous lookup operation is stored together with the input (destination address). When a destination address or other relevant input information appears on the lines 21, it is also transferred to the cache memory 39, and if it is found in the cache memory 39, the respective output information is transferred through lines 41 to the lookup engine 19 which then can stop the lookup operation and transfer the output information on lines 23 to the policer 25 and the switching unit 29. If the destination address was not yet stored in the cache memory 39, the corresponding output information found in a search operation is received from the lookup engine 19 over lines 43, so that both can be stored in the cache memory 39.

As the cache memory 39 is of limited size, it would be filled up after some time and old cache entries should be canceled to allow storage of new cache entries. The well-known least-recently used (LRU) algorithm can be used for selecting cache entries to be canceled. However, as was mentioned in the introduction, the LRU algorithm may be an inadequate procedure: For periodic transmissions, there will be many intervening data packets between two sequential data packets of the same flow, so that many cache entries of the cache memory 39 will be canceled before they can be used again. Therefore, another solution for optimizing the utilization of cache memory 39 space is introduced.

Selection Procedure for Caching

Figure 2:
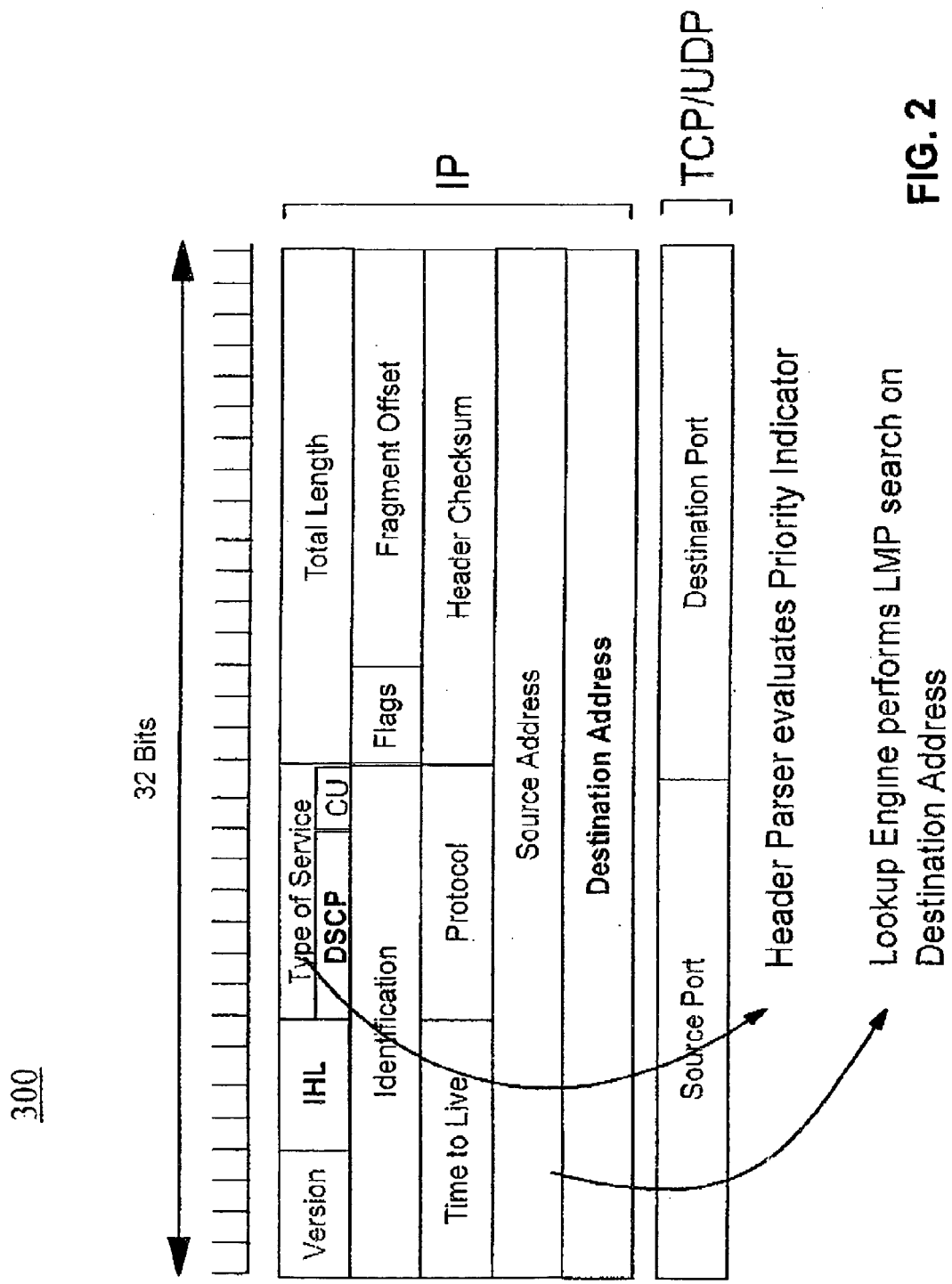
FIG. 2 shows a data packet header for schematically representing the operations of the header parser for making cache entry decisions when a priority is explicitly indicated.

Cache entries are made for data packets selected in a selection step, e.g. those of higher priorities or having other criteria such as a start of flow identifier which hints on subsequently expected data packets with identical address (e.g. TCP-SYN). A group of such data packets tat belong together in that sense are referred to as a data packet flow. The selection step could be made, as illustrated in FIG. 2 for a first embodiment 200 by the header parser 17 which sends a respective signal to the cache memory 39 and to the lookup engine 19 over lines 21. Another solution as illustrated in FIG. 3 for a second embodiment 300, is to make the selection depending on the result of a lookup operation in the lookup engine 19 which then sends a respective selection signal over lines 43 to the cache memory 39. This second scheme is used when, e.g., the data packet priority cannot be explicitly deduced from the data packet header but is determined during a data packet classification process. A third embodiment 400 for a cache entry decision comprising evaluation and selection is illustrated in FIG. 4: The header parser 17 evaluates in an evaluation step data packet headers to detect the start or end of a TCP (bulk) transmission. If such a start or end is detected, this result is used for determining whether for a data packet a cache entry shall be inserted or not.

Operation with the selection mechanism is as follows:

The header of each incoming data packet is entered into the header parser 17. The relevant information, e.g. destination address, is transferred to the cache memory 39 and the lookup engine 19 which both start their operation in parallel to find the required output information (target port selection). In a checking step it is checked whether the address information or associated output link information of the data packet is already contained in the cache memory 39.

The header parser 17 and/or the lookup engine 19 also evaluate received information to determine whether the corresponding data packet (PDU) is of a category or data flow that deserves inserting an entry into the cache memory 39. This is the evaluation and selection step.

(a) If the input and corresponding output information are found during the checking step in the cache memory 39, the operation of the lookup engine 19 is stopped; this result is transferred over lines 41 through the lookup engine 19 and the policer 25 to the switching unit 29. The data packet is forwarded in a forwarding step under use of the output information that has been found.

(b) If the input information is not found in the cache memory 39, the lookup engine 19 completes its lookup step and, besides transferring the result of this lookup step (target port identification) via the policer 25 to the switching unit 29, also provides it to the cache memory 39 through the lines 43. This cache memory 39 stores in an entry step the input information (destination address) and corresponding output link information (target port ID) in a cache entry if and only if it receives a select-signal from the header parser 17 or from the lookup engine 19 on the lines 21 or 43, respectively.

Details of Different Cache Entry Selection Steps

The selection decision for inserting a cache entry can be based on various criteria, such as address information or communication protocol information about the applied communication protocol. In the following, three examples are given for a selection based either on priority of the received data packets (PDUs), or on an indication of a data packet bulk (group) transmission. In one example, the data packet priority is directly indicated in the data packet header. In another example there is an indirect priority indication which is derived from the header contents. In the third example, indications of first and last data packets of TCP transmissions are used as selection criterion.

1) Cache Entry Selection Based on Explicit Priority Encoding:

FIG. 2 shows the header of a data packet in which those portions are marked which are (a) evaluated as criterion for making a cache entry decision, and which are (b) used as input value for the lookup operation. These portions represent the classification information which allows to evaluate the data packet and to classify it whether it belongs to the data packets for which a cache entry is inserted or not. The decision criterion is an explicit encoding of the priority of the respective data packet and of all the other data packets which are part of the same data flow. This criterion may be either DiffServ DSCP or VLAN priority bits. The header parser 17 evaluates these bits and depending on the result signals to the lookup engine 19 and to the cache memory 39 whether the search result is to be cached or not.

The destination address from the header is extracted by the header parser 17 and transferred to the lookup engine 19 which then performs a longest matching prefix search in its (IPv4) routing table, and provides a respective output value (target port identification) on its outputs on the lines 23, 43. The lookup engine 19 then triggers the entry of the destination address and of the search result (target port and possibly queue priority) into the cache memory 39. However, if the respective destination address had been found in the cache memory 39 already, the lookup operation would have been interrupted, and the output result, i.e. target port etc., will be provided to the lookup engine 19 over the lines 41, and transferred from there through the lines 23 and the policer 25 to the switching unit 29.

In this example, the header parser 17 makes the cache entry decision based on the explicit priority indication, and the lookup engine 19 only makes a longest matching prefix search for obtaining the required target port identification (and possibly an assigned priority value).

2) Cache Entry Selection Based on Implicit Priority Encoding:

FIG. 3 also shows a data packet (PDU) header in which other fields are marked, i.e. hashed, which are used for evaluation: a five-tuple consisting of (a) protocol indicator, (b) source address, (c) destination address, (d) source port, and (e) destination port. These values are extracted by the header parser 17 and provided to the lookup engine 19. The lookup engine 19 contains the rule table of which an example is shown in the table at the end of present description, by which a classification can be made on the basis of protocol/address five-tuples. The result of the search, i.e. lookup, in the rule table provides two values: (1) a classification (high/low/deny) which determines the priority of the respective data packet. This priority value is provided to the switching unit 29. It also determines whether a cache entry must be made in the cache memory 39, e.g. cache entries to be made only for a high priority. (2) The lookup in the rule table further provides the identification of the target port to be used for the respective data packet.

If a cache entry is to be made into the cache memory 39 for a data packet, this will contain the five-tuple extracted from the header, and the classification result plus the target port identification. As in the first example, if the cache memory 39 already contained the respective five-tuple, the search in the lookup engine 19 is interrupted, and the priority value and destination port ID are transferred from the cache memory 39 to the switching unit 29 through the lookup engine 19 and the policer 25.

Thus, in this second example, the header parser 17 only extracts five relevant fields from the data packet header, whereas the lookup engine 19, besides finding the required target port, also makes the cache entry decision.

3) Other Decision Principles for Cache Entry Selection

Application of the invention is of course not limited to cases as given in the two examples above. Any single header field or combination of header fields which reflect the traffic or flow category of the data packet or its priority can be taken as decision criteria, e.g. MPLS labels, ATM UPI/VCI labels, Ethernet MAC addresses, etc.

Another option for selecting a data packet flow for cache entry, i.e. for entering data packet address and output port information into the cache memory 39, is described below in a third embodiment example with reference to FIG. 4. The respective situation is when a number of data packet arrivals from the same flow can be expected in almost consecutive order or at least with relatively small gaps between individual data packets (locality or burstiness of data packets of the same flow). Such circumstances or conditions can, for example, be deduced from individual data packet headers in the following way, c.f. FIG. 4: TCP transmissions typically start with a so called SYN message to synchronize the sequence numbers between transmitting and receiving terminal. SYN messages are recognized by a particular control bit (SYN, marked in FIG. 4) set in the TCP header, and are hence easily to parse or detect. The header parser 17 (see FIG. 1) will send a cache entry control signal to the cache memory 39, and the destination port address of the SYN message as well as the output link information, also referred to as address information, provided by the lookup operation for the SYN message will then be entered into the cache memory 39. There is a high probability that subsequent data packets will arrive with the same address information so that output link information can directly be taken from the cache memory 39 for each subsequent data packet of the bulk transmission. This applies hence to burst-type traffic of data packets.

The same scheme can also be applied to explicitly remove respective cache entries from the cache memory 39 and free the corresponding space for new cache entries, as will be explained below. The apparatus for controlling the insertion of cache entries into the cache memory 39, in which incoming data packets are directed to output links according to address information, hence comprises the header parser 17 which here unifies three functionalities: a) an evaluator for evaluating for each incoming data packet classification information which is relevant to the type of flow or to the priority to which the data packet is associated, b) a selector for selecting based on the result of the evaluation step whether for the data packet the cache entry is to be inserted into the cache memory 39, and c) a cache read/write unit for inserting as the cache entry into the cache memory 39, in the case the result of the selection step is that the cache entry is to be inserted, for the data packet the address information and associated output link information. All these functionalities need not be unified but can be performed by separate units also. The apparatus here further comprises an output unit 29 for forwarding the data packet under use of output link information stored in that cache entry, if the address information or associated output link information is found in a cache entry.

Deletion of Entries from the Cache Memory

Even when the described method is used, the cache memory 39 might eventually be filled up, and a cache entry should be deleted from the cache memory 39 to clear a storage position before another cache entry can be inserted. The rule for cache entry deletion can be independent of the cache entry decision mechanism used, but it could also use the same selection scheme. The LRU rule can be used of course for clearing cache positions.

Another mechanism which is suggested as advantageous for cache position clearing in connection with the cache entry decision mechanism of the third selection example described above (for TCP bulk data packet transmissions) is as follows (cf. also FIG. 4):

The last data packet of one TCP session has a FIN control bit (marked in FIG. 4) set in the TCP header. This FIN message is straightforward to parse or detect in the header parser 17 (FIG. 1), and the header parser 17 will send a control signal for deleting a respective cache entry in the cache memory 39 having the same destination port address as found in the TCP FIN message, because no more data packets with this address are expected to arrive.

Summary of Advantages Gained

As was already shortly mentioned in the introduction, the major advantages that are gained when the described method is employed in a communication system transmitting addressed data packets to various destinations are:

For data packet flows which have a high temporal locality of data packets, or which have a particular priority, or which have other selectable criteria, cache entries into a cache memory are inserted. This will speed up the operation of data packet transfers in switching nodes compared to other systems using a normal, i.e. unselected cache entry mechanism, while ensuring that the sizes of cache memories can be smaller as otherwise required for systems using normal cache entry.

Example for a Classification Rule Table

| | Input = 5-tuple (Each Field: Either a Range or a Single Value) | | | | | Search Result | |
|---|---|---|---|---|---|---|---|
| No. | SA | DA | SP | DP | PROT | Class | Port |
| 01 | 00000000–ffffffff | 84c90000–84c9ffff | 006f–006f | 0000–ffff | 6—6 | deny | — |
| 02 | 00000000–ffffffff | 9bb30000–9bb3ffff | 006f–006f | 0000–ffff | 6—6 | deny | — |
| 03 | 00000000–ffffffff | 84c90000–84c9ffff | 006f–006f | 0000–ffff | 11—11 | deny | — |
| 04 | 00000000–ffffffff | 9bb30000–9bb3ffff | 006f–006f | 0000–ffff | 11—11 | deny | — |
| 05 | 00000000–ffffffff | 84c90000–84c9ffff | 0801–0801 | 0000–ffff | 6—6 | deny | — |
| 06 | 00000000–ffffffff | 9bb30000–9bb3ffff | 0801–0801 | 0000–ffff | 6—6 | deny | — |
| 07 | 00000000–ffffffff | 84c90000–84c9ffff | 0801–0801 | 0000–ffff | 11—11 | deny | — |
| 08 | 00000000–ffffffff | 9bb30000–9bb3ffff | 0801–0801 | 0000–ffff | 11—11 | deny | — |
| 09 | 00000000–ffffffff | 84c90000–84c9ffff | 0000–ffff | 0000–ffff | 1—1 | high | 7 |
| 10 | 00000000–ffffffff | 9bb30000–9bb3ffff | 0000–ffff | 0000–ffff | 1—1 | low | 4 |
| 11 | 00000000–ffffffff | 84c92a0a–84c92a0a | 0019–0019 | 0000–ffff | 6—6 | low | 4 |
| 12 | 00000000–ffffffff | 84c92a0a–84c92a0a | 0035–0035 | 0000–ffff | 6—6 | low | 7 |
| 13 | 00000000–ffffffff | 84c92a0a–84c92a0a | 0035–0035 | 0000–ffff | 11—11 | low | 9 |

-continued

| | Input = 5-tuple (Each Field: Either a Range or a Single Value) | | | | | Search Result | |
|---|---|---|---|---|---|---|---|
| No. | SA | DA | SP | DP | PROT | Class | Port |
| 14 | 00000000–ffffffff | 84c92a0a–84c92a0a | 0400–ffff | 0000–ffff | 11—11 | low | 6 |
| 15 | 00000000–ffffffff | 84c92ab8–84c92ab8 | 0035–0035 | 0000–ffff | 6—6 | low | 3 |

We claim:

1. A method comprising inserting cache entries into a cache memory, in a device in which incoming data packets are directed to output links according to address information, the step of inserting comprising the following steps:
   a) an evaluation step for evaluating for each said incoming data packet classification information which is relevant to the type of flow or to the priority to which said data packet is associated, said data packet classification information being positive when indicating one of:
      information indicating that it is foreseeable that additional data packets of the same data packet flow will follow within a relatively short time period, said time being measured in data packet arrival rate, and
      information that said flow is a periodic data packet flow;
   b) a selection step for selecting based on the result of said evaluation step being positive, that for said data packet said cache entry is to be inserted into said cache memory and
   c) an entry step for inserting as said cache entry into said cache memory; in the case the result of said selection step is that said cache entry is to be inserted, for said data packet said address information and associated output link information.

2. Method according to claim 1, further comprising
   a) a checking step for checking for each data packet, whether its address information or associated output link information is already contained in a cache entry, and
   b) a forwarding step for forwarding said data packet under use of output link information stored in that cache entry, if the address information or associated output link information is found in a cache entry,
   wherein if the address information or associated output link information is not found in a cache entry, the evaluation step and the selection step are performed for said data packet.

3. Method according to claim 1, wherein in the case a cache entry is to be made, said output link information is obtained from a lookup step using a routing table.

4. Method according to claim 3, wherein said lookup step is started together with a checking step for checking for each data packet, whether its address information or associated output link information is already contained in a cache entry, and is stopped if the address information or associated output link information is found in a cache entry.

5. Method in accordance with claim 1, wherein data packets associated with burst-type traffic are selected for inserting a corresponding cache entry into said cache memory.

6. Method in accordance with claim 1, wherein data packets that have a data packet header field identifying said data packet as a starting or synchronizing data packet of a sequence of related data packets, are selected for inserting a corresponding cache entry into said cache memory.

7. Method in accordance with claim 1, wherein data packets selected for inserting a corresponding cache entry into said cache memory is made on the basis of criteria contained in the header of the data packet.

8. Method in accordance with claim 7, wherein the criteria include address information and communication protocol information.

9. Method in accordance with claim 1, wherein selection of a data packet for cache entry is made also in the same unit that determines the output link information.

10. Method in accordance with claim 1, further comprising a removal decision step wherein a decision whether to remove a cache entry from the cache memory is made in dependence of the type of flow to which the respective cache entry is associated, and in dependence of the cache filling grade.

11. An article of manufacture comprising a computer usable medium having computer readable program code means embodied therein for causing insertion of cache entries into a cache memory, the computer readable program code means in said article of manufacture comprising computer readable program code means for causing a computer to effect the steps of claim 1.

12. A program storage device readable by machine, tangibly embodying a program of instructions executable by the machine to perform method steps for inserting cache entries into a cache memory, said method steps comprising the steps of claim 1.

13. Method according to claim 1, further comprising
   a checking step for checking for each data packet, whether its address information or associated output link information is already contained in a cache entry, and
   a forwarding step for forwarding said data packet under use of output link information stored in that cache entry, if the address information or associated output link information is found in a cache entry;
   a removal decision step wherein a decision whether to remove a cache entry from the cache memory is made in dependence of the type of flow to which the respective cache entry is associated, and in dependence of the cache filling grade;
   wherein if the address information or associated output link information is not found in a cache entry, the evaluation step and the selection step are performed for said data packet;
   wherein in the case a cache entry is to be made, said output link information is obtained from a lookup step using a routing table;
   wherein said lookup step is started together with a checking step for checking for each data packet whether its address information or associated output link information is already contained in a cache entry, and is stopped if the address information or associated output link information is found in a cache entry;

wherein data packets associated with burst-type traffic are selected for inserting a corresponding cache entry into said cache memory;

wherein data packets tat have a data packet header field identifying said data packet as a starting or synchronizing data packet of a sequence of related data packets, are selected for inserting a corresponding cache entry into said cache memory;

wherein data packets selected for inserting a corresponding cache entry into said cache memory is made on the basis of criteria contained in the header of the data packet;

wherein the criteria include address information and communication protocol information; and wherein selection of a data packet for cache entry is made also in the same unit that determines the output link information.

14. An apparatus for controlling the insertion of cache entries into a cache memory in a device, in which incoming data packets are directed to output links according to address information, the apparatus comprising:

a) an evaluator for evaluating for each said incoming data packet classification information which is relevant to the type of flow or to the priority to which said data packet is associated, said data packet classification information being positive when indicating one of:

information indicating that it is foreseeable that additional data packets of the same data packet flow will follow within a relatively short time period, said time being measured in data packet arrival rate, and information that said flow is a periodic data packet flow;

b) a selector for selecting based on the result of said evaluation step being positive, that for said data packet said cache entry is to be inserted into said cache memory, c) a cache read/write unit for inserting as said cache entry into said cache memory, in the case the result of said selection step is that said cache entry is to be inserted, for said data packet said address information and associated output link information.

15. An apparatus according to claim 14, further comprising an output unit for forwarding said data packet under use of output link information stored in a cache entry, if the address information or associated output link information is found in that cache entry.

16. An apparatus according to claim 14, further comprising a routing table.

17. A computer program product comprising a computer usable medium having computer readable program code means embodied therein for causing insertion of cache entries into a cache memory, the computer readable program code means in said computer program product comprising computer readable program code means for causing a computer to effect the functions of claim 14.

* * * * *